United States Patent [19]

Berry

[11] Patent Number: 4,545,962
[45] Date of Patent: Oct. 8, 1985

[54] RECOVERY OF URANIUM FROM A MIXTURE OF WESTERN URANIUM ORE AND PHOSPHATE ROCK

[75] Inventor: William W. Berry, Lakeland, Fla.

[73] Assignee: International Minerals & Chemical Corp., Terre Haute, Ind.

[21] Appl. No.: 85,676

[22] Filed: Oct. 17, 1979

[51] Int. Cl.$^4$ .............................................. C01G 43/00
[52] U.S. Cl. ......................................... 423/20; 423/10
[58] Field of Search ..................................... 423/20, 10

[56] References Cited

U.S. PATENT DOCUMENTS

| 3,711,591 | 1/1973 | Hurst et al. | 423/10 |
| 3,836,476 | 9/1974 | Baldwin et al. | 423/10 |
| 4,190,633 | 2/1980 | Smith et al. | 423/10 |

OTHER PUBLICATIONS

Galkin, N. P. et al., *Technology of Uranium*, pp. 116–121, 1964, AEC-tr-6638.
Merritt, "The Extractive Metallurgy of Uranium", pp. 21, 22, 27 & 39–41, Colorado School of Mines (1971).

Primary Examiner—Edward A. Miller
Attorney, Agent, or Firm—Robert H. Dewey

[57] ABSTRACT

An otherwise unusable western sandstone uranium ore is blended with uranium-containing phosphate rock. The mixture is then digested with sulfuric acid to produce a wet process phosphoric acid solution containing higher levels of uranium. Recovery of the uranium values from this solution can be effected by various known processes such as solvent extraction.

5 Claims, No Drawings

RECOVERY OF URANIUM FROM A MIXTURE OF WESTERN URANIUM ORE AND PHOSPHATE ROCK

The mining of phosphate rock such as that found in Florida and many countries of the world, e.g., Morocco has as its prime objective the production of phosphate-containing fertilizer. In one widely used process, the phosphate values are recovered from the rock by digestion with sulfuric acid to produce a phosphoric acid solution (called wet process phosphoric acid) and an insoluble calcium sulfate (gypsum). Phosphate rock may contain significant quantities of uranium, e.g., on the order of from about 0.1 to 0.5 pounds of uranium per ton of phosphate rock mined and more generally within the range of about 0.2 to about 0.4 pounds per ton. During the digestion step the uranium values are solubilized resulting in a uranium concentration (expressed as $U_3O_8$) in the wet-process phosphoric acid of from about 0.05 to about 0.3 grams per liter and more generally from about 0.15 to about 0.25 grams per liter.

Attempts to recover uranium values from wet-process phosphoric acid have centered on the use of solvent extraction processes in which the uranium values are transferred to an organic phase, stripped from the organic phase and subsequently recovered as a uranium precipitate. The uranium-free wet-process phosphoric acid is then processed conventionally to form various phosphate-containing fertilizer products.

The uranium solvent extraction process which has generated the most commercial interest is the so-called reductive stripping extraction process developed by Oak Ridge National Laboratories (ORNL). See Hurst, U.S. Pat. No. 3,711,581; Hurst, et al, "Recovery of Uranium from Wet-Process Phosphoric Acid", I & EC Process Design and Development, Vol. II, p. p. 122-128, January 1972; Hurst et al, "Recovering Uranium from Wet-Process Phosphoric Acid", *Chemical Engineering*, Jan. 3, 1977, p. 56-57; See also, Hurst et al, ORNL-TM-2522 (1969) and Hurst et al, ORNL-2952 (1960). The ORNL process as described in the Hurst '591 patent employs a synergistic extraction mixture of di(2-ethylhexyl)phosphoric acid (DEPA) and trioctyl-phosphine oxide (TOPO) dissolved in an organic diluent. This extraction mixture is known to have a high affinity for uranium in the hexavalent oxidation state.

A more widely utilized uranium source is western uranium ores. These ores are primarily sandstone in nature and contain uranium in various mineral forms. Western sandstone ores may contain as much as 1.0% uranium (expressed as $U_3O_1$) but generally contain from about 0.1% to about 0.3% uranium oxide. Most large deposits of these ores are processed on or near the mine site to minimize transportation of the sandstone gangue. In some instances, however, sandstone ore deposits may be either too small or too remotely located to justify the construction of a full scale recovery system. Moreover, some otherwise high grade ore deposits cannot be processed in the conventional western uranium mills because of high impurity levels. Ores with high humate or carbonate concentrations are particularly troublesome in these systems.

The present invention is based on the discovery that uranium can be more efficiently and economically recovered by blending a small amount of high $U_3O_8$ western sandstone ore with phosphate rock and processing the resulting blend in a conventional phosphoric acid facility having a uranium recovery operation. The use of such an approach not only markedly improves the economics of uranium recovery from phosphate rock, but also provides for the recovery of uranium from western sandstone ores which for various reasons were not previously utilized at all.

The process of the present invention comprises the steps of forming a mixture comprising uranium-containing phosphate rock and western uranium ore; digesting the mixture with a sulfuric acid solution to produce a uranium-containing solution of phosphoric acid; and recovering the uranium values from the phosphoric acid solution.

In the practice of the present invention any of the conventional western sandstone uranium ores may be employed. As indicated above, the preferred sources of western ores are deposits which are either too small or too remote for on-site processing, or which cannot be easily processed via western ore techniques due to high impurity levels.

The first step of the process of the present invention comprises blending the uranium ore with phosphate rock. The components of this blend can be sized, e.g., by grinding, before or preferably after the blending step to a particle size normally employed in conventional phosphate rock processing. Phosphate rock feed material is generally ground to a particle size of about 60%-200 mesh with up to about 5% plus 35 mesh. Rock comprising a majority of particles in the −100 to −200 mesh range can be employed. The amount of $U_3O_8$ ore added to the mixture can vary widely depending on the particular ore being processed, the nature and capacity of the phosphoric acid recovery facility, the economic incentives present and numerous other factors such as regulatory limits. Any proportion of uranium ore which is suitable under the specific processing conditions being utilized can be employed according to the present invention. In most circumstances it is preferred to employ a blend comprising a major portion of phosphate rock and a minor portion of uranium ore. In a typical phosphate acid facility of the type found in Florida, amounts of up to about 200 lbs of $U_3O_8$ ore per ton of phosphate rock generally may be employed. The practical upper limit of $U_3O_8$ or content it these plants as presently constituted is largely dependent on the filtration capacity of the facility. Preferred are $U_3O_8$ ore additions in the range of from about 10 to about 100 lbs per ton of phosphate rock. Most preferred is an ore addition of about 50 lbs/ton of phosphate rock.

The next step in the process of the present invention is digestion of the $U_3O_8$-phosphate rock mixture with sulfuric acid. The presence of a minor amount of $U_3O_8$ ore in the phosphate rock feed does not interfere with any of the digestion methods employed in typical phosphoric acid facilities. Therefore the parameters of digestion such as contact time, temperature, acid concentration, etc. are not critical and those values normally employed for phosphate rock alone may be utilized. Typically the acid concentraion is adjusted to give a $P_2O_5$ content in the filtrate of about 28-32%. Digestion temperatures will usually run from about 170°-180° F. and normal contact times run from about 10 to 16 hours. It is preferred to operate the digestion step under oxidizing conditions to ensure the oxidation of uranium values present.

After the mixture of $U_3O_8$ ore and phosphate rock has been completely digested, the resulting $P_2O_5$ solution, which contains most of the uranium values, is separated from the reaction solids—i.e., gypsum. Conventional phosphoric acid filtration systems may be employed to effect the separation.

The resulting crude wet process phosphoric acid stream will contain a higher amount of uranium per ton of $P_2O_5$ than that normally associated with wet-process phosphoric acid. The increased concentration of uranium in the phosphoric acid stream results in higher uranium yields than presently possible from phosphate rock and, therefore, makes the economics of uranium recovery from phosphoric acid more attractive. Typically, phosphoric acid solutions processed according to the preferred embodiments of the process of the present invention can contain from about 0.25 to about 0.5 g/l of $U_3O_8$ or more depending on the amount of $U_3O_8$ ore added and the concentration of $U_3O_8$ in the ore.

The uranium may be recovered from the wet process phosphoric acid by any of the known techniques. The preferred manner of recovery is based on solvent extraction techniques. A particularly preferred process is that described in commonly assigned U.S. patent application Ser. No. 22,079 entitled "Recovery of Uranium from Wet-Process Phosphoric Acid" filed on March 19, 1979 in the names of the Berry and Henrickson.

The following example is intended to illustrate more fully the nature of the present invention without acting as a limitation on its scope.

EXAMPLE

The uranium ore used in this example was a western sandstone ore having the following approximate analysis:

| Weight | Percent |
|---|---|
| $U_3O_8$ | 0.151 |
| $V_2O_5$ | 1.00 |
| Cu | 0.0006 |
| $CO_2$ | 1.9 |

This ore was ground to 60%–200 mesh and blended with ground phosphate rock at the rate of 20 lbs of ore per ton of phosphate rock. The blended mixture was then digested with a mixture of $H_2SO_4$ and water sufficient to produce a filtrate of approximately 28% $P_2O_5$, with a free $H_2SO_4$ content of about 2%. Air was sparged through the digestion slurry to ensure uranium oxidation. The temperature during the reaction was maintained in the range of about 80°–90° F. After the reaction was complete the slurry was filtered to remove gypsum and the first filtrate was collected for uranium recovery. This phosphoric acid solution has a uranium content, expressed as $U_3O_8$, of about 0.2 g/l. Results indicate that generally, over 90% of the $U_3O_8$ added to the acid via the sandstone is dissolved into the phosphoric acid stream.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for recovering uranium values comprising the steps of forming a mixture comprising uranium-containing phosphate rock and western sandstone uranium ore; digesting said mixture with a sulfuric acid solution to produce a uranium-containing solution of phosphoric acid; and recovering said uranium values from said phosphoric acid solution.

2. The process of claim 1 additionally comprising the step of grinding said uranium ore and said phosphate rock prior to said digesting step.

3. The process of claim 1 wherein said mixture contains up to about 200 lbs of uranium ore per ton of phosphate rock.

4. The process of claim 1 wherein said uranium-containing phosphoric acid solution contains from about 28 to about 32% $P_2O_5$.

5. The process of claim 1 wherein said uranium-containing phosphoric acid solution contains from about 0.25 to about 0.50 grams of uranium (as $U_3O_8$) per liter.

* * * * *

UNITED STATES PATENT AND TRADEMARK OFFICE
CERTIFICATE OF CORRECTION

PATENT NO. : 4,545,962

DATED : October 8, 1985

INVENTOR(S) : William W. Berry

It is certified that error appears in the above-identified patent and that said Letters Patent are hereby corrected as shown below:

Column 1, line 52, "U3O1" should read --U3O8--.

Column 2, line 44, "it" should read --in--.

Signed and Sealed this

Twentieth Day of May 1986

[SEAL]

Attest:

DONALD J. QUIGG

Attesting Officer

Commissioner of Patents and Trademarks